United States Patent
Zhi et al.

(10) Patent No.: US 9,877,218 B2
(45) Date of Patent: *Jan. 23, 2018

(54) METHOD AND APPARATUS FOR IMPLEMENTING REPORT MEASUREMENT AND REPORTING MEASUREMENT RESULT

(71) Applicant: HUAWEI TECHNOLOGIES CO., LTD., Shenzhen (CN)

(72) Inventors: Yuliang Zhi, Tianjin (CN); Yanyan Chen, Shenzhen (CN); Xudong Yang, Shanghai (CN); Bingzhao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 40 days.

This patent is subject to a terminal disclaimer.

(21) Appl. No.: 15/083,468

(22) Filed: Mar. 29, 2016

(65) Prior Publication Data

US 2016/0212651 A1    Jul. 21, 2016

Related U.S. Application Data

(63) Continuation of application No. 14/486,134, filed on Sep. 15, 2014, now Pat. No. 9,338,684, which is a (Continued)

(30) Foreign Application Priority Data

Mar. 16, 2012  (CN) .......................... 2012 1 0082722
Oct. 31, 2012  (CN) .......................... 2012 1 0427635

(51) Int. Cl.
H04W 24/10    (2009.01)
H04W 72/04    (2009.01)
H04W 36/00    (2009.01)

(52) U.S. Cl.
CPC ....... *H04W 24/10* (2013.01); *H04W 36/0088* (2013.01); *H04W 72/04* (2013.01)

(58) Field of Classification Search
CPC ............. H04W 24/10; H04W 36/0088; H04W 36/0016; H04W 36/0061; H04W 36/0083;
(Continued)

(56) References Cited

U.S. PATENT DOCUMENTS 9,338,684 B2 *   5/2016   Zhi ...................... H04W 24/10
2004/0248605 A1  12/2004  Cao et al.
(Continued)

FOREIGN PATENT DOCUMENTS

CN          1574681        2/2005
CN          1921678        2/2007
(Continued)

OTHER PUBLICATIONS

PCT International Search Report dated May 2, 2013 in corresponding International Patent Application No. PCT/CN2013/071305.
(Continued)

*Primary Examiner* — Diane Mizrahi
(74) *Attorney, Agent, or Firm* — Staas & Halsey LLP

(57) ABSTRACT

According to the embodiments of the present invention, a report measurement can be implemented between a radio network controller and a user equipment in a CELL_FACH state by using a current MC message and a current MR message; and in a process of implementing the report measurement, coordination between the report measurement and a cell reselection measurement executed by the user equipment can be implemented to minimize an impact of the report measurement on the cell reselection measurement.

24 Claims, 5 Drawing Sheets

Related U.S. Application Data continuation of application No. PCT/CN2013/071305, filed on Feb. 2, 2013.

(58) Field of Classification Search
CPC ..... H04W 36/04; H04W 72/02; H04W 72/04; H04W 72/0413; H04W 72/042
See application file for complete search history.

(56) References Cited

U.S. PATENT DOCUMENTS

| | | | |
|---|---|---|---|
| 2011/0188396 | A1 | 8/2011 | Jung et al. |
| 2012/0015657 | A1 | 1/2012 | Comsa et al. |
| 2014/0056220 | A1 | 2/2014 | Poitau et al. |
| 2014/0112254 | A1 | 4/2014 | Lindoff et al. |
| 2017/0171786 | A1* | 6/2017 | Mochizuki ............ H04W 36/04 |

FOREIGN PATENT DOCUMENTS

| | | |
|---|---|---|
| CN | 101154970 | 4/2008 |
| CN | 101299865 | 11/2008 |

OTHER PUBLICATIONS

"3rd Generation Partnership Project; Technical Specification Group Radio Access Network; Radio Resource Control (RRC); Protocol specification (Release 11)", 3GPP TS 25.331, V11.1.0, Mar. 2012, 1911 pp.

International Search Report dated May 2, 2013, in corresponding International Patent Application No. PCT/CN2013/071305.

Extended European Search Report dated Mar. 12, 2015 in corresponding European Patent Application No. 13760296.7.

Alcatel-Lucent, "Measured Results on RACH", 3GPP TSG-RAN2 Meeting #77, Dresden, Germany, Feb. 2012, 2 pp.

Renesas Mobile Europe Ltd, "Enhanced Network Control of Mobility in CELL_FACH", 3GPP TSG-RAN WG2 Meeting #77, Dresden, Germany, Feb. 2012, 5 pp.

Huawei, HiSilicon, "Discussion on CELL_FACH mobility enhancement to LTE", 3GPP TSG RAN WG2 #78, Prague, CZ, May 2012, pp. 1-5.

"3rd Generation Partnership Project; Technical Specification Group Radio Access Network; Radio Resource Control (RRC); Protocol specification (Release 11)", 3GPP TS 25.331, V11.0.0, Dec. 2011, 1910 pp.

Office Action dated Aug. 27, 2015 in related U.S. Appl. No. 14/486,134.

Notice of Allowance dated Jan. 4, 2016 in related U.S. Appl. No. 14/486,134.

U.S. Appl. No. 14/486,134, filed Sep. 15, 2014, Yuliang Zhi et al., Huawei Technologies Co., Ltd.

* cited by examiner

METHOD AND APPARATUS FOR IMPLEMENTING REPORT MEASUREMENT AND REPORTING MEASUREMENT RESULT

CROSS-REFERENCE TO RELATED APPLICATIONS

This application is a continuation of U.S. patent application Ser. No. 14/486,134, filed on Sep. 15, 2014, which is a continuation of International Application No. PCT/CN2013/071305, filed on Feb. 2, 2013, which claims priorities to Chinese Patent Application No. 201210082722.7, filed on Mar. 16, 2012 and Chinese Patent Application No. 201210427635.0, filed on Oct. 31, 2012, all of which are hereby incorporated by reference in their entireties.

TECHNICAL FIELD

The present invention generally relates to mobile communications systems, and in particular, to a method and an apparatus for implementing a report measurement and reporting a measurement result in a mobile communications system.

BACKGROUND

In an existing mobile communications system, because of mobility of a user equipment (UE) and complexity and variety of radio channel quality, the UE needs to start a measurement operation on a serving cell, a neighboring cell, a frequency, or the like, according to a configuration of a radio network controller on a network side. If a measurement result meets a specific condition, a cell selection or reselection operation of the UE or a redirection, handover, or cell change operation of the radio network controller can be performed so that the UE camps on a most proper cell.

For example, in a universal mobile telecommunications (UMTS) system, when the UE is in a cell forward access channel (CELL_FACH) state, the UE can start measurement according to configuration parameters in a system broadcast message and select a proper cell by using a cell reselection manner. Meanwhile, on the network side, the radio network controller can hand over, according to a load situation of a current cell or a service type of the UE and by means of a redirection or cell change operation, the UE to a target cell or frequency specified by the radio network controller. However, when the radio network controller specifies a target frequency or cell during the redirection, handover, or cell change operation, the radio network controller cannot reference real-time signal quality of the UE. Therefore, when the UE executes a corresponding operation according to an instruction of the radio network controller, if signal quality of the target cell or the target frequency is poor, the redirection, handover, or cell change operation fails.

When the UE is in a cell dedicated channel (CELL_DCH) state, the UE does not execute cell reselection, and the radio network controller can instruct, by using a UE-specific message, for example, a measurement control (MC) message, the UE to perform measurement. If the measurement result meets a specific condition, the UE can report a measurement result to the radio network controller by using a measurement report (MR) message, to assist the radio network controller in executing the redirection, handover, or cell change operation. When the radio network controller makes a redirection, handover, or cell change decision, the radio network controller can reference the signal quality of the target cell or frequency reported by the UE. Therefore, when the UE executes a related operation according to the instruction of the radio network controller, an operation failure probability due to poor signal quality of the target cell or frequency can be reduced.

Generally, the MC message may include one or more pieces of information such as a measurement identity (ID), a measurement command (e.g. establish, modify, or release command), measurement report reporting manner, an additional measurement list, and a measurement type.

The measurement type generally may include one or more pieces of information such as a measurement object, a measurement quantity, a reporting quantity, a measurement reporting criterion, and measurement validity.

The radio network controller may indicate a specific measurement type in the measurement object, for example, an intra-frequency measurement, an inter-frequency measurement, an inter-system measurement, and a position measurement. The intra-frequency measurement refers to a measurement on a cell that is in a same system as a serving cell of the UE and has a same frequency as the serving cell of the UE. The inter-frequency measurement refers to a measurement on a cell that is in a same system as a serving cell of the UE but has a frequency different from that of the serving cell of the UE, as well as on the frequencies. The inter-system measurement refers to a measurement on a system that is different from a system to which a serving cell of the UE belongs. The UE can execute different measurements on different systems. For example, for a global system for mobile communications (GSM) system, the UE may execute measurement on a cell and a frequency; and for a long term evolution (LTE) system, may execute measurement only on a frequency. In addition, the radio network controller may further indicate a cell or a frequency to be added to or deleted in a measurement object. The UE can execute an adding or deletion operation on cells or frequencies in a cell information list (CELL_INFO_LIST) or an evolved universal terrestrial radio access (EUTRA) frequency information list (EUTRA_FREQUENCY_INFO_LIST) stored on the UE. Optionally, the radio network controller may carry a list of a cell to be measured or a frequency to be measured in the measurement object to further specify cells or frequencies that need to be measured by the UE. If the measurement object does not carry the list of the cell to be measured or the frequency to be measured, the UE needs to perform measurement on all cells and/or frequencies in the cell information list and/or the frequency information list. The measurement reporting criterion defines a reporting mode, that is, periodical reporting or event-triggered reporting. Periodical reporting indicates that the UE reports a measurement result to the radio network controller at an interval of a specific time. Event-triggered reporting means that the radio network controller first defines a series of events and the UE reports a measurement result to the radio network controller only when these events are met. The series of events may include, for example, events that signal quality of a serving cell is higher than a threshold, signal quality of a serving cell is lower than a threshold, average signal quality of a target cell within a period of time is higher than a threshold, and the like.

When requiring the UE to execute a report measurement, the radio network controller can set the foregoing information properly in the MC message, so that the UE is capable of executing a report measurement and reporting a measurement result.

In addition, the MR message may generally include one or more pieces of information such as a measurement ID, a measurement result, and an event result.

The foregoing prior art of executing a report measurement has the following disadvantages: 1. A report measurement solution based on an MC message and an MR message can be used only when the UE is in a CELL_DCH state; 2. When the UE is in the CELL_FACH state, because the UE needs to execute cell reselection measurement, if the solution used when the UE is in the CELL_DCH state is directly introduced, the cell reselection measurement may be affected.

In the existing mobile communications system, the following manner used to report a measurement result is provided.

A radio network controller may broadcast, by using a system information block (SIB) message, a report indication to a UE in the system. Generally, the report indication may include an intra-frequency measurement indication and/or an inter-frequency measurement indication. The intra-frequency measurement indication may include a reporting quantity (for example, a ratio of energy per chip to noise spectral density Ec/N0, and reference signal received power RSRP) and the number of reported cells that are reported during the intra-frequency measurement. The inter-frequency measurement indication may include a reporting quantity (for example, Ec/N0 and RSRP), the number of reported cells, a reporting threshold, and the like that are reported during the inter-measurement.

After the UE executes a measurement, the UE can send a measurement result to the radio network controller by using an uplink signaling message. For example, the UE can generate, based on the measurement result, a measurement information element, for example, a measurement information element of measurement results on a random access channel (RACH) (Measured Results on RACH), and use an uplink signaling message such as an RRC connection request message (on a common control channel CCCH), a cell update message (on the CCCH), an initial direct transfer message (on a dedicated control channel DCCH), and an uplink direct transfer message (on the DCCH) to carry the measurement information element, so that signal quality of intra-frequency and/or inter-frequency cells measured by the UE is carried to the radio network controller.

However, because an uplink signaling message on the CCCH, for example, the RRC connection request message and the cell update message, has the fixed maximum number of uplink transmission bits (for example, for an R99 channel, the maximum number of uplink transmission bits is a fixed value; for an eRACH channel, the maximum number of uplink transmission bits depends on an initial authorized value), the following regulations are generally used: 1. The UE reports only valid measurement results to the radio network controller; 2. If a remaining size of the uplink signaling message on the CCCH cannot meet a requirement for reporting the measurement information element, the UE does not perform reporting; otherwise, the UE reports intra-frequency measurement results or measurement results of both the intra-frequency measurement and the inter-frequency measurement according to a specific situation, that is, it reports the intra-frequency measurement results preferentially.

Generally, the reported measurement results include the intra-frequency measurement results and/or the measurement results of the inter-frequency measurement. In the intra-frequency measurement results, the signal quality of the serving cell needs to be included, but signal quality of another cell to be measured is optional, and the signal quality of another cell to be measured may be reported according to the best signal quality. A measurement result of the inter-frequency measurement generally includes an ID of a cell with signal quality reaching a threshold, measurement values (specific to SIB 11 or SIB 12) of the cell, and the like. If the uplink signaling message on the CCCH is used for reporting and a size of the uplink signaling message is limited, the number of cells in the reported measurement result should be limited, and the number of cells in the measurement result of the inter-frequency measurement should be limited preferentially.

The foregoing prior art of executing a report measurement has the following disadvantages: 1. The prior art is applicable to intra-frequency measurement and inter-frequency measurement only; 2. The report indication can only indicate a cell to be measured; 3. A precedence order for reporting measurement results are not specified for inter-system measurement.

Therefore, this field requires a technology that can more efficiently implement a report measurement and reporting of a measurement result.

SUMMARY

Multiple aspects of the present invention provide a method and an apparatus for implementing a report measurement and reporting a measurement result.

According to one aspect of the present invention, a method for implementing a report measurement by a UE in a CELL_FACH state is provided, including: receiving an MC message from a radio network controller; if it is determined to execute a report measurement, executing the report measurement based on the MC message so as to obtain a measurement result; generating an MR message based on the measurement result; and sending the MR message to the radio network controller.

According to another aspect of the present invention, a method for implementing a report measurement is provided, including: generating an MC message for a UE in a CELL_FACH state; sending the MC message to the UE; and attempting to receive, from the UE, an MR message in response to the MC message, where the MR message is generated based on a measurement result of a report measurement executed by the UE.

According to another aspect of the present invention, a method for reporting a measurement result by a UE is provided, including: receiving a report indication from a radio network controller by using one message of an SIB message and a radio resource control (RRC) message, where the report indication specifies a condition for reporting a measurement result; acquiring cell selection or reselection measurement results that need to be reported; generating a measurement information element based on the report indication and by using the cell selection or reselection measurement results; and sending the measurement information element to the radio network controller by using an uplink signaling message.

According to another aspect of the present invention, a method for reporting a measurement result is provided, including: generating a report indication, where the report indication specifies a condition for reporting a measurement result; sending the report indication to a UE by using one message of an SIB message and an RRC message; and receiving a measurement information element from the UE by using an uplink signaling message, where the measurement information element is generated based on the report indication and by using cell selection or reselection measurement results.

According to another aspect of the present invention, a user equipment (UE) is provided, including: a receiver, configured to receive an MC message from a radio network controller when the UE is in a CELL_FACH state; a processor, configured to: if it is determined to execute a report measurement, execute the report measurement based on the MC message so as to obtain a measurement result, and generate an MR message based on the measurement result; and a transmitter, configured to send the MR message to the radio network controller.

According to another aspect of the present invention, a radio network controller is provided, including: a processor, configured to generate an MC message for a UE in a CELL_FACH state; a transmitter, configured to send the MC message to the UE; and a receiver, configured to attempt to receive, from the UE, an MR message in response to the MC message, where the MR message is generated based on a measurement result of a report measurement executed by the UE.

According to another aspect of the present invention, a user equipment (UE) is provided, including: a receiver, configured to receive a report indication from a radio network controller by using one message of an SIB message and an RRC message, where the report indication specifies a condition for reporting a measurement result; a processor, configured to acquire cell selection or reselection measurement results that need to be reported, and generate a measurement information element based on the report indication and by using the cell selection or reselection measurement results; and a transmitter, configured to send the measurement information element to the radio network controller by using an uplink signaling message.

According to another aspect of the present invention, a radio network controller is provided, including: a processor, configured to generate a report indication, where the report indication specifies a condition for reporting a measurement result; a transmitter, configured to send the report indication to a UE by using one message of an SIB message and an RRC message; and a receiver, configured to receive a measurement information element from the UE by using an uplink signaling message, where the measurement information element is generated based on the report indication and by using cell selection or reselection measurement results.

According to one aspect of the present invention, an apparatus for implementing a report measurement is provided, including: a receiving module, configured to receive an MC message from a radio network controller when the UE is in a CELL_FACH state; an executing module, configured to: if it is determined to execute a report measurement, execute the report measurement based on the MC message so as to obtain a measurement result; a generating module, configured to generate an MR message based on the measurement result; and a sending module, configured to send the MR message to the radio network controller.

According to another aspect of the present invention, an apparatus for implementing a report measurement is provided, including: a generating module, configured to generate an MC message for a UE in a CELL_FACH state; a sending module, configured to send the MC message to the UE; and a receiving module, configured to attempt to receive, from the UE, an MR message in response to the MC message, where the MR message is generated based on a measurement result of a report measurement executed by the UE.

According to another aspect of the present invention, an apparatus for reporting a measurement result by a UE is provided, including: a receiving module, configured to receive a report indication from a radio network controller by using one message of an SIB message and an RRC message, where the report indication specifies a condition for reporting a measurement result; an acquiring module, configured to acquire cell selection or reselection measurement results that need to be reported; a generating module, configured to generate a measurement information element based on the report indication and by using the cell selection or reselection measurement results; and a sending module, configured to send the measurement information element to the radio network controller by using an uplink signaling message.

According to another aspect of the present invention, an apparatus for reporting a measurement result is provided, including: a generating module, configured to generate a report indication, where the report indication specifies a condition for reporting a measurement result; a sending module, configured to send the report indication to a UE by using one message of an SIB message and an RRC message; and a receiving module, configured to receive a measurement information element from the UE by using an uplink signaling message, where the measurement information element is generated based on the report indication and by using cell selection or reselection measurement results.

According to another aspect of the present invention, a machine readable medium is provided, in which an instruction set is stored; and when the instruction set is executed, the machine can execute the foregoing methods.

By using the foregoing solutions, a radio network controller on a network side can be assisted efficiently in making a redirection, handover, or cell change decision, which reduces a probability of failure of a redirection, handover, or cell change operation.

DESCRIPTION OF EMBODIMENTS

Figure 1:
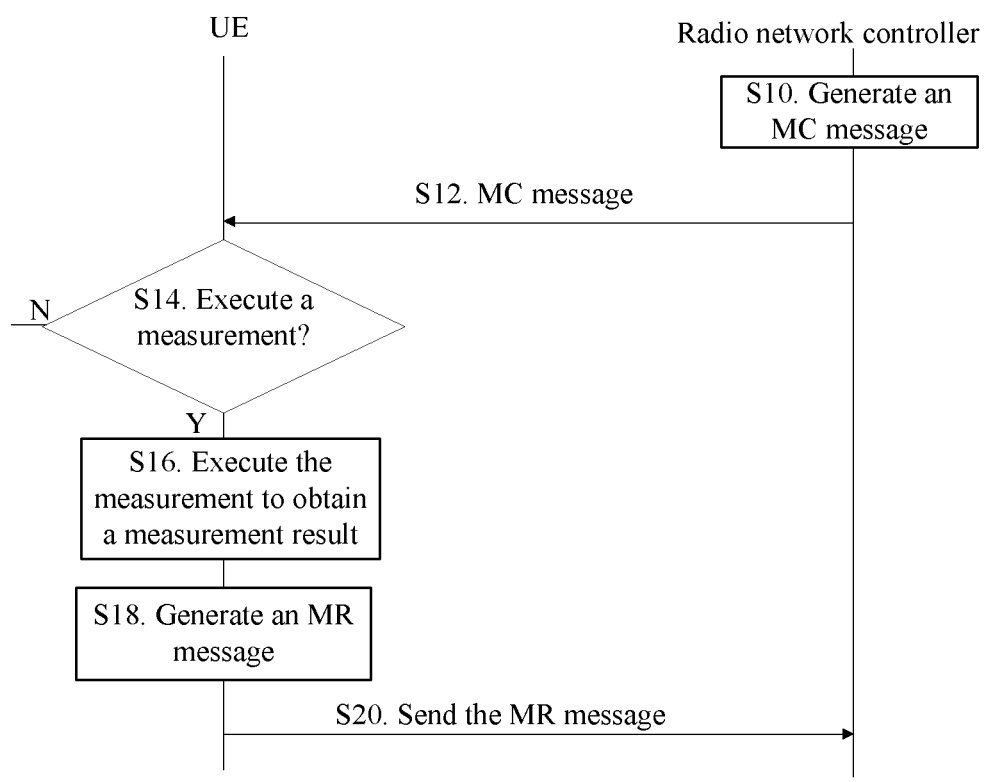
FIG. 1 shows an exemplary flowchart of a method for implementing a report measurement according to an embodiment of the present invention.

In the following descriptions, for the purpose of description rather than limitation, specific details such as specific system structures, interfaces, and technologies are provided to better understand the present invention. However, those skilled in the art should clearly understand that the present invention may also be implemented in other embodiments without these specific details. In other cases, details of commonly known apparatuses, circuits, and methods are omitted to prevent unnecessary details from affecting description of the present invention.

The technology described in this document can be used in various communications systems, for example, existing 2G and 3G communications systems and next generation communications systems such as a GSM system, a code division multiple access (CDMA) system, a time division multiple access (TDMA) system, a wideband code division multiple access (WCDMA) system, a frequency division multiple access (FDMA) system, an orthogonal frequency-division multiple access (OFDMA) system, a single carrier FDMA (SC-FDMA) system, a general packet radio service (GPRS) system, an LTE system, and other similar communications systems.

In this document, various aspects are described with reference to a user equipment and/or a base station and/or a base station controller.

The user equipment may be a wireless terminal or a wired terminal, where the wireless terminal may be a device that provides a user with voice and/or data connectivity, a handheld device with a wireless connection function, or another processing device connected to a wireless modem; and the wireless terminal may communicate with one or more core networks through a radio access network (RAN), and the access terminal may be a mobile terminal, such as a mobile phone (or called a "cellular" phone), and a computer with the mobile terminal, such as a portable, pocket-size, handheld, computer built-in, or vehicle-mounted mobile apparatus which exchange voice and/or data with the radio access network. For example, the wireless terminal may be a device such as a personal communication service (PCS) telephone, a cordless telephone, a session initiation protocol (SIP) telephone, a wireless local loop (WLL) station, and a personal digital assistant (PDA). The wireless terminal may also be called a system, a subscriber unit, a subscriber station, a mobile station, a mobile, a remote station, an access point, a remote terminal, an access terminal a user terminal, a user agent, or a user device.

A base station (for example, an access point) may refer to a device that is on an access network and communicates with a wireless terminal on an air interface through one or more sectors. The base station may be used to perform mutual conversion between a received air frame and an IP packet to serve as a router between the wireless terminal and other parts of the access network, where the other parts of the access network may include an Internet Protocol (IP) network. The base station may also coordinate management over attributes of the air interface. For example, the base station may be a base transceiver station (BTS) in GSM or CDMA, or a NodeB in WCDMA, or an evolved NodeB in LTE, which is not limited in the present invention.

A base station controller may be a base station controller (BSC) on the GSM or the CDMA or be a radio network controller (RNC) on the WCDMA, which is not limited in the present invention.

In addition, terms "system" and "network" in this document are often be used interchangeably in this document. In this document, a term "and/or" only describes an association relationship between associated objects and indicates that three relationships may exist, for example, A and/or B, which may indicate the following three cases: only A exists, A and B exist concurrently, and only B exists. In addition, in this document, a character "/" generally indicates that an or relationship exists between two associated objects.

FIG. 1 shows an exemplary flowchart of a method for implementing a report measurement according to an embodiment of the present invention.

In S10, a radio network controller may generate a measurement control (MC) message for a UE in a CELL_FACH state.

Optionally, the MC message may indicate a cell to be measured and/or a frequency to be measured.

Optionally, the MC message may specify a reporting mode, for example, the reporting mode may include at least one of the event-triggered reporting and the need-based reporting. As aforementioned, the event-triggered reporting means that the radio network controller first defines a series of events and the UE reports a measurement result to the radio network controller only when these events are satisfied. According to this embodiment, the need-based reporting means that after receiving an MC message from the radio network controller, the UE needs to execute a measurement and reports a measurement result to the radio network controller, and then stops the measurement.

In S12, the radio network controller may send the MC message. For example, the MC message may be sent through a dedicated control channel (DCCH).

In S14, the UE may determine whether to execute a report measurement. For example, the determining process may consider coordination between the report measurement and a cell reselection measurement executed by the UE, which are detailed hereinafter with reference to specific instances. If the UE determines to execute the report measurement, the method goes to S16; otherwise, the UE does not execute an operation with respect to the MC message.

In S16, if the UE has already determined to execute the report measurement, the UE may execute the report measurement based on the MC message so as to obtain a measurement result.

Optionally, the UE may execute a corresponding measurement according to different measurement types. For example, the UE execute a corresponding measurement according to an intra-frequency measurement, an inter-frequency measurement, an inter-system measurement, and the like.

In addition, the MC message may define specific measurement quantities when the UE executes the report measurement. For example, these measurement quantities may include a ratio of energy per chip to noise spectral density of a common pilot channel (CPICH Ec/N0), reference signal received power (RSRP), path loss (Path Loss), and the like. Therefore, the UE may execute the report measurement according to these measurement quantities included in the MC message.

In S18, the UE may generate a measurement report (MR) message according to a measurement result of the report measurement executed in S16.

In S20, the UE may send the MR message to the radio network controller. For example, the MR message may be sent through the DCCH.

The following describes some specific implementations of the foregoing method with reference to detailed instances.

In one instance of the present invention, after the UE receives the MC message, the UE may determine whether to execute the report message by determining a received signal level and received signal quality of a serving cell. For example, if the UE determines that the received signal level of the serving cell is higher than a first threshold (that is, SrxlevServingCell>Spriorirysearch1) and the received signal quality of the serving cell is higher than a second threshold (that is, SqualServingCell>Spriorirysearch2), the UE may determine to stop executing the cell reselection measurement and starts executing the report measurement indicated by the MC message. The first threshold and the second threshold may be default values pre-defined by a system or be a specific value defined based on an actual network situation or a system requirement. After executing the report measurement and obtaining the measurement result, the UE may further generate the MR message and sends the MR message to the radio network controller.

In another instance of the present invention, after the UE receives the MC message, if the UE determines that the received signal level of the serving cell is lower than or equal to the first threshold or the received signal quality of the serving cell is lower than or equal to the second threshold, the UE may determine not to execute the report measurement. In this case, optionally, if the MC message indicates a reporting mode of event-triggered reporting, the UE does not execute the report measurement according to the MC message, and nor does it perform reporting. However, optionally, if the MC message indicates a reporting mode of need-based reporting, the UE does not execute the report measurement according to the MC message but the UE still may attempt to perform reporting. Specifically, the UE may determine whether cells and/or frequencies same as a cell to be measured and/or a frequency to be measured (if any) that are indicated in the MC message exist in the cell reselection measurement executed by the UE; if such cells and/or frequencies exist, the UE may include results of a cell reselection measurement on the serving cell in the MR message, and/or include results of a cell reselection measurement on the cells same as the cell to be measured and/or results of a cell reselection measurement on the frequencies same as the frequency to be measured in the cell reselection measurement in the MR message so as to perform reporting to the radio network controller.

In another instance of the present invention, after the UE receives an MC message, if the UE determines that the received signal level of the serving cell is lower than or equal to the first threshold or the received signal quality of the serving cell is lower than or equal to the second threshold, the UE may determine to execute the report measurement and meanwhile does not stop executing the cell reselection measurement. In this way, the UE may further generate the MR message based on the measurement result of the report measurement and send the MR message to the radio network controller. Optionally, if cell reselection occurs in a process of executing the report measurement by the UE, the UE may send, in a new cell, the MR message to the radio network controller.

In another instance of the present invention, after the UE receives the MC message, if the UE determines that the received signal level of the serving cell is lower than or equal to the first threshold or the received signal quality of the serving cell is lower than or equal to the second threshold, the UE may further determine whether a frequency to be measured (if any) that are indicated in the MC message are in a range of currently measured frequencies of the cell reselection measurement.

If the UE determines that the frequency to be measured are in the range of the currently measured frequencies, the UE determines to continue executing the cell reselection measurement. In this case, when generating the MR message, the UE may include the results of the cell reselection measurement on the frequencies same as the frequency to be measured in the cell reselection measurement in the MR message.

If the UE determines that the frequency to be measured are beyond the range of the currently measured frequencies, in a case that the cell reselection measurement is performed on a system of two standards (for example, two radio access technologies (RAT)), the UE may further execute the following two operations.

(1) In a case that a system to which the frequency to be measured belong is different from the system of two standards, the UE determines to execute a measurement on cells and/frequencies of only one selected system of the system of two standards and the system to which the frequency to be measured belong. Optionally, the selected system may be determined by selecting a system with a higher priority and a system of better signal quality or a system same as a system where the serving cell is located. Optionally, the UE may determine the priority of a corresponding system according to priorities of frequencies that undergo the cell reselection measurement, and may determine signal quality of the system by using signal quality obtained in the cell reselection measurement. For example, if the cell reselection measurement executed by the UE is performed on system A and system B but the system to which the frequency to be measured belong is system C, the UE may stop executing a measurement on a system with a lower priority (for example, system A) between system A and system B. In this way, besides a report measurement on system C, the UE executes a cell reselection measurement on system B only.

(2) In a case that the system to which the frequency to be measured belong is the same as one of the system of two standards, the UE may further determine whether a sum of a quantity of the frequency to be measured and a quantity of frequencies in the cell reselection measurement meets a performance requirement of a maximum quantity of measured frequencies of the user equipment. If it is determined that the sum meets the performance requirement of the maximum quantity of measured frequencies of the user equipment, the UE may determine to execute a measurement on the frequency to be measured and meanwhile does not stop executing the cell reselection measurement. If it is determined that the sum does not meet the performance requirement of the maximum quantity of measured frequencies of the user equipment, the UE may determine to execute a measurement on the frequency to be measured and determine to stop executing a cell reselection measurement on frequencies with lower priorities or frequencies with poor signal quality in the cell reselection measurement, so that a sum of a quantity of remaining frequencies in the cell reselection measurement and a quantity of the frequency to be measured meet the performance requirement of the maximum quantity of measured frequencies of the user equipment.

According to the method shown in FIG. 1, in this embodiment, a report measurement between a radio network controller and a UE in a CELL_FACH state can be implemented by using a current MC message and a MR message, and in a process of implementing a report measurement, coordination between the report measurement and a cell reselection measurement executed by the UE can be performed, so as to minimize impact of the report measurement on the cell reselection measurement.

Figure 2:
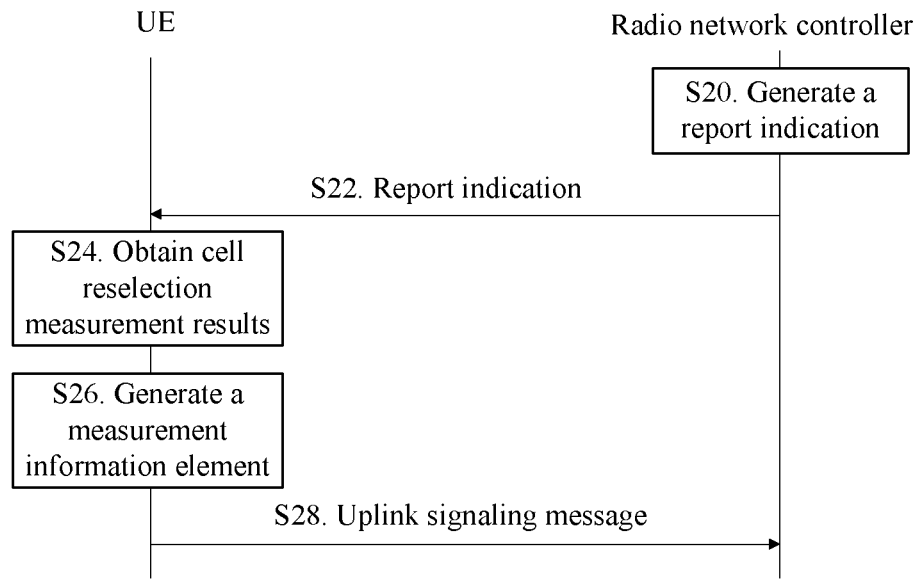
FIG. 2 shows an exemplary flowchart of a method for reporting a measurement result according to another embodiment of the present invention.

FIG. 2 shows an exemplary flowchart of a method for reporting a measurement result according to another embodiment of the present invention.

In S20, a radio network controller may generate a report indication. The report indication specifies a condition for reporting a measurement result. For example, the report indication corresponding to a specific measurement type may include one or more of reporting quantities, a reporting threshold, the number of reported cells, and the number of reported frequencies.

In S22, the radio network controller may send the generated report indication to a UE. For example, the radio network controller may broadcast the report indication to the UE by using a system broadcast message, for example, an SIB message. In addition, for example, the radio network controller may also send the report indication to the UE by using a radio resource control (RRC) message, where the RRC message may be a proprietary message of the UE, for example, the MC message is a specific RRC message.

In S24, the UE may acquire cell selection or reselection measurement results that need to be reported. Optionally, the UE may execute an operation of determining whether there are cell selection or reselection measurement results already exist; if the cell selection or reselection measurement results exist, the method continues to be executed; otherwise, the method ends.

In S26, the UE may generate a measurement information element based on the report indication and by using the cell selection or reselection measurement results, for example, measurement results on RACH (Measured results on RACH). As aforementioned, the measurement information element may be transmitted in an uplink signaling message such as an RRC connection request message, a cell update message, an initial direct transfer message, and an uplink direct transfer message, so that the measurement results are carried to the radio network controller through such uplink signaling messages.

If a size of the uplink signaling message is not limited, the UE may include all cell selection or reselection measurement results in the measurement information element.

However, if the size of the uplink signaling message is limited, the UE may only include a part of the cell selection or reselection measurement results in the measurement information element. According to this embodiment, the UE may select, based on a specific sequence, this part of the measurement results included in the measurement information element.

According to this embodiment, optionally, the radio network controller may generate additional frequency information. The additional frequency information indicates additional frequencies, where these additional frequencies are frequencies that are only used to execute the cell selection or reselection measurement but are not used to execute cell reselection assessment. When the cell selection or reselection measurement is executed, these frequencies need to be used as high-priority frequencies for the measurement. Optionally, the additional frequencies may be defined to have the highest reporting priority among all frequencies of a same measurement type. In addition, optionally, the additional frequencies may also be defined to have the highest reporting priority among all frequencies of various measurement types. The radio network controller may send the additional frequency information to the UE by using an SIB message or an RRC message. For example, the additional frequency information may be sent with the report indication in a same message (an SIB message or an RRC message). In addition, for example, the additional frequency information may also be sent individually in an SIB message or an RRC message different from a message in which the report indication is sent.

According to this embodiment, optionally, the radio network controller may generate reporting precedence order information. The reporting precedence order information specifies a reporting precedence order of measurement results of different measurement types in the cell selection or reselection measurement results, where the reporting precedence order may be used to determine how to select the measurement results of different measurement types preferentially when the cell selection or reselection measurement results are reported. These measurement types may include one or more of an intra-frequency measurement, an inter-frequency measurement, and an inter-system measurement. For example, the reporting precedence order may indicate that a measurement result of the inter-system measurement has the highest reporting priority, a measurement result of the inter-frequency measurement has a second higher reporting priority, and a measurement result of the intra-frequency measurement has the lowest reporting priority. In addition, another reporting precedence order may also be defined for the measurement results of the foregoing measurement types according to an actual need.

The radio network controller may send the reporting precedence order information to the UE by using an SIB message or an RRC message. For example, the reporting precedence order information may be sent with the report indication (and/or the additional frequency information) in a same message (an SIB message or an RRC message). In addition, for example, the reporting precedence order information may also be sent individually in an SIB message or an RRC message different from a message in which the report indication is sent.

Specifically, the radio network controller may send a specified reporting precedence order to the UE by using many manners.

Manner 1

The radio network controller delivers a numerical value to the UE, where different values of the numerical value in its value range represent various combinations of reporting priorities of intra-frequency measurement, inter-frequency measurement, and inter-system measurement. For example, numerical values 0 to 5 represent six different priority reporting orders, where reporting orders corresponding to 0 to 5 may be as follows:

0: Intra-frequency>inter-frequency>inter-system
  1: Intra-frequency>inter-system>inter-frequency
  2: Inter-frequency>intra-frequency>inter-system
  3: Inter-frequency>inter-system>intra-frequency
  4: Inter-system>Intra-frequency>inter-frequency
  5: Inter-system>inter-frequency>Intra-frequency However, it is not limited to such a correspondence relationship. For example, 0 may correspond to any one of the six priorities, 1 may correspond to any one of priorities except the priority corresponding to 0, and 2, 3, 4, and 5 may be deduced in the same manner.

Manner 2

The radio network controller may deliver an intra-frequency reporting priority and an inter-frequency reporting priority to the UE; or deliver the intra-frequency reporting priority and an inter-system reporting priority to the UE; or deliver the inter-frequency reporting priority and the inter-system reporting priority to the UE. The following gives an example that the radio network controller delivers the inter-frequency reporting priority and the inter-system reporting priority to the UE.

The inter-frequency reporting priority includes high, medium, and low.

The inter-system reporting priority includes high, medium, and low.

It is assumed that the inter-frequency reporting priority is set to high. The inter-system reporting priority may be set to medium or low.

If the inter-system reporting priority of is medium, the intra-frequency reporting priority is low; and an intra-frequency, inter-frequency, and inter-system reporting order is as follows: Inter-frequency>inter-system>intra-frequency.

If the inter-system reporting priority is low, the intra-frequency reporting priority is medium; and the intra-frequency, inter-frequency, and inter-system reporting order is as follows: Inter-frequency>intra-frequency>inter-system.

It is assumed that the inter-frequency reporting priority is medium. The inter-system reporting priority may be set to high or low.

If the inter-system reporting priority is high, the intra-frequency reporting priority is low; and the intra-frequency, inter-frequency, and inter-system reporting order is as follows: Inter-system>inter-frequency>intra-frequency.

If the inter-system reporting priority is low, the intra-frequency reporting priority is high; and the intra-frequency, inter-frequency, and inter-system reporting order is as follows: Intra-frequency>inter-frequency>inter-system.

It is assumed that the inter-frequency reporting priority is set to low. The inter-system reporting priority may be set to high or medium.

If the inter-system reporting priority is high, the intra-frequency reporting priority is low; and the intra-frequency, inter-frequency, and inter-system reporting order is as follows: Inter-frequency>inter-system>intra-frequency.

If the inter-system reporting priority is medium, the intra-frequency reporting priority is low; and the intra-frequency, inter-frequency, and inter-system reporting order is as follows: Inter-frequency>intra-frequency>inter-system.

Manner 3

The radio network controller delivers an intra-frequency and inter-frequency reporting priority relationship and the inter-system reporting priority to the UE; or delivers an intra-frequency and inter-system reporting priority relationship and the inter-frequency reporting priority to the UE; or delivers an inter-frequency and inter-system reporting priority relationship and the intra-frequency reporting priority. The following gives an example that the radio network controller delivers the inter-frequency and inter-system reporting priority relationship and the intra-frequency reporting priority to the UE.

The inter-frequency and inter-system reporting priority relationship includes inter-frequency precedence and inter-system precedence, which indicate: when inter-frequency and inter-system measurement results are reported, if a size of an uplink message is limited, whether the UE reports the intra-frequency measurement results or reports the inter-system measurement results.

The intra-frequency reporting priority includes high, medium, and low and indicates the reporting priorities of the intra-frequency measurement results. High means that reporting of the intra-frequency measurement results has the highest priority among the three measurement types of intra-frequency, inter-frequency, and inter-system; and when the size of the uplink message is limited, the UE reports the intra-frequency measurement results. Medium means that reporting of the intra-frequency measurement results has the medium priority among the three measurement types of intra-frequency, inter-frequency, and inter-system. Low means that reporting of the intra-frequency measurement results has the lowest priority among the three measurement types of intra-frequency, inter-frequency, and inter-system.

If the inter-frequency and inter-system reporting priority relationship is set to inter-frequency precedence, the intra-frequency reporting priority may be set to high, medium, or low; if the intra-frequency reporting priority is high, the intra-frequency, inter-frequency, and inter-system reporting order is as follows: Intra-frequency>inter-frequency>inter-system; if the intra-frequency reporting priority is medium, the intra-frequency, inter-frequency, and inter-system reporting order is as follows: Inter-frequency>intra-frequency>inter-system; if the intra-frequency reporting priority is low, t the intra-frequency, inter-frequency, and inter-system reporting order is as follows: Inter-frequency>inter-system>intra-frequency.

Similarly, if the inter-frequency and inter-system reporting relationship is set to inter-system precedence, the intra-frequency reporting priority may be set to high, medium, or low; if the intra-frequency reporting priority is high, the intra-frequency, inter-frequency, and inter-system reporting order is as follows: intra-frequency>inter-system>inter-frequency; if the intra-frequency reporting priority is medium, the intra-frequency, inter-frequency, and inter-system reporting order is as follows: inter-system>intra-frequency>inter-frequency; if the intra-frequency reporting priority is low, the intra-frequency, inter-frequency, and inter-system reporting order is as follows: Inter-system>inter-frequency>intra-frequency.

Manner 4

The radio network controller delivers the intra-frequency and inter-frequency reporting priority relationship and the inter-system reporting priority to the UE; or delivers the intra-frequency and inter-system reporting priority relationship and the inter-frequency reporting priority; or delivers the inter-frequency and inter-system reporting priority relationship and the intra-frequency reporting priority to the UE.

For example, the inter-frequency and inter-system reporting priority relationship includes inter-frequency precedence and inter-system precedence, which indicate: when the inter-frequency and inter-system measurement results are reported, if the size of the uplink message is limited, whether the UE reports the inter-frequency measurement results or reports the inter-system measurement results.

For example, the intra-frequency reporting priority includes high and low and indicates the reporting priority of the intra-frequency measurement results. High means that reporting of the intra-frequency measurement results has the highest priority among the three measurement types of intra-frequency, inter-frequency, and inter-system; and when the size of the uplink message is limited, the UE reports the intra-frequency measurement results. Low means that reporting of the intra-frequency measurement results has the lowest priority among the three measurement types of intra-frequency, inter-frequency, and inter-system.

For example, if the inter-frequency and inter-system reporting priority is set to inter-frequency precedence, the intra-frequency reporting priority may be set to high or low; if the intra-frequency reporting priority is high, the intra-frequency, inter-frequency, and inter-system reporting order is as follows: intra-frequency>inter-frequency>inter-system; if the intra-frequency reporting priority is low, the intra-frequency, inter-frequency, and inter-system reporting order is as follows: inter-frequency>inter-system>intra-frequency.

For example, it is assumed that the inter-frequency and inter-system reporting priority relationship is set to inter-system precedence, the intra-frequency reporting priority may be set to high or low; if the intra-frequency reporting priority is high, the intra-frequency, inter-frequency, and inter-system reporting order is as follows: intra-frequency>inter-system>inter-frequency; if the intra-frequency reporting priority is low, the intra-frequency, inter-frequency, and inter-system reporting order is as follows: inter-system>inter-frequency>intra-frequency.

Manner 5

For example, the radio network controller delivers the intra-frequency and the inter-frequency reporting priority relationship and/or the inter-system reporting priority to the UE; or delivers the intra-frequency and inter-system reporting priority relationship and/or the inter-frequency reporting priority to the UE; or delivers the inter-frequency and inter-system reporting priority relationship and/or the intra-frequency reporting priority to the UE. The following gives an example that the radio network controller delivers the inter-frequency and inter-system reporting priority relationship and/or the intra-frequency reporting priority to the UE.

The inter-frequency and inter-system reporting priority relationship includes inter-frequency precedence and inter-system precedence.

The intra-frequency reporting priority may have the following three forms:

The intra-frequency reporting priority includes high and low;

the intra-frequency reporting priority includes high; and the intra-frequency reporting priority includes low.

For example, if the radio network controller delivers the intra-frequency reporting priority to the UE, the reporting priority order among the three of intra-frequency, inter-frequency, and inter-system is determined according to the intra-frequency reporting priority and an inter-frequency and inter-system reporting priority indication.

For example, if the radio network controller does not deliver the intra-frequency reporting priority to the UE, it indicates that reporting of the intra-frequency measurement results has the highest priority or the lowest priority among the three measurement types of intra-frequency, inter-frequency, and inter-system.

Manner 6

The radio network controller delivers the inter-frequency and inter-system reporting priority relationship to the UE so as to specify that the intra-frequency reporting priority is the highest or the lowest.

For example, the relationship between the inter-frequency and inter-system reporting priority relationship includes inter-frequency precedence and inter-system precedence.

For example, assuming it is specified that the intra-frequency reporting priority is the lowest, if the inter-frequency and inter-system reporting priority relationship is set to inter-frequency precedence, the intra-frequency, inter-frequency, and inter-system reporting order is as follows: inter-frequency>inter-system>intra-frequency; and if the inter-frequency and inter-system reporting priority relationship is set to inter-system precedence, the intra-frequency, inter-frequency, and inter-system reporting order is as follows: inter-system>inter-frequency>intra-frequency.

For example, assuming it is specified that the intra-frequency reporting priority is the highest, if the inter-frequency and inter-system reporting priority relationship is set to inter-frequency precedence, the intra-frequency, inter-frequency, and inter-system reporting order is as follows: intra-frequency>inter-frequency>inter-system; and if the inter-frequency and inter-system reporting priority relationship is set to inter-system precedence, the intra-frequency, inter-frequency, and inter-system reporting order is as follows: intra-frequency>inter-system>inter-frequency.

The following gives an instance for description. It is assumed that the intra-frequency measurement corresponds to a frequency f0, the inter-frequency measurement corresponds to frequencies f1 and f2, the inter-system measurement corresponds to a frequency f3, and a reporting precedence order specified by the radio network controller is as follows: intra-frequency>inter-frequency>inter-system, and it is assumed that an additional frequency f4 specified by the radio network controller belongs to the inter-system measurement. If the additional frequency is defined to have the highest reporting priority among all frequencies of various measurement types, measurement results may be arranged according to a sequence of f4, f0, f1, f2, and f3 when a measurement information element is generated. If the additional frequency is defined to have the highest reporting priority among all frequencies of a same measurement type, measurement results may be arranged according to a sequence of f0, f1, f2, f4, and f3 when the measurement information element is generated.

As aforementioned, the radio network controller may send the additional frequency information and/or the reporting precedence order information to the UE. Therefore, before executing the operation of generating the measurement information element in S26, the UE may attempt to receive the additional frequency information from the radio network controller and attempt to receive the reporting precedence order information from the radio network controller.

In a first case, if the UE receives the additional frequency information and receives the reporting precedence order information, the UE may first execute a measurement on the additional frequency so as to obtain a measurement result of the additional frequency. In a process of generating the measurement information element, the UE may include a measurement result of a serving cell of the UE in the measurement information element. If the UE determines that the additional frequency is defined to have the highest reporting priority among all frequencies of various systems, the UE may further include the measurement result of the additional frequency in the measurement information element. Then, the UE may arrange the cell selection or reselection measurement results in a descending order according to the reporting precedence order, and therefore may include the cell selection or reselection measurement results in a remaining part of the measurement information element in a descending order according to the reporting precedence order until the remaining part is fully filled. For example, assuming that the reporting precedence order is as follows: inter-system measurement>inter-frequency measurement>intra-frequency measurement, within the remaining part of the measurement information element, the UE may preferentially select the measurement results of the inter-system measurement so as to include the measurement results in the remaining part. If a limitation scope of the size of the uplink signaling message is reached (for example, the remaining part has already been fully filled), subsequent measurement results of the inter-frequency measurement and the intra-frequency measurement are discarded. Otherwise, an attempt of selecting the measurement results of the inter-frequency measurement and the intra-frequency measurement in sequence continues so as to include the measurement results in the remaining part.

In a second case, if the UE receives the additional frequency information and receives the reporting precedence order information, the UE may first execute the measurement on the additional frequency so as to obtain the measurement result of the additional frequency. In the process of generating the measurement information element, the UE may include the measurement result of the serving cell of the UE in the measurement information element. If the UE determines that the additional frequency is defined to have the highest reporting priority among all frequencies of the same measurement type, the UE may include the cell selection or reselection measurement results in the remaining part of the measurement information element in a descending order according to the reporting precedence order until the remaining part is fully filled. In this process, when it is the turn to include measurement results of a measurement type to which the additional frequency belongs in the measurement information element, the UE may first select a measurement result of the additional frequency. This is because the measured result of the additional frequency has the highest reporting priority among the measurement results of the measurement type to which the additional frequency belongs.

In the foregoing first and second cases, optionally, in a process of including the cell selection or reselection measurement results in the remaining part of the measurement information element, measurement results of the same measurement type (for example, the inter-frequency measurement or the inter-system measurement) may also be selected according to a frequency priority order, where the frequency priority order may be pre-learned from the UE through a common means. Using the inter-frequency measurement as an example, if measurement results of the inter-frequency measurement are included in the measurement information element according to a precedence order, the measurement results of the inter-frequency measurement may be included in the measurement information element in a descending order according to the frequency priority order.

In a third case, if the UE receives the additional frequency information but does not receive the reporting precedence order information, the UE may first execute the measurement on the additional frequency so as to obtain the measurement result of the additional frequency. In the process of generating the measurement information element, the UE may include a measurement result of the serving cell of the UE and the measurement result of the additional frequency separately in the measurement information element. Then, the UE may include the cell selection or reselection measurement results in the remaining part of the measurement information element in a descending order according to the frequency priority order until the remaining part is fully filled.

In a fourth case, if the UE receives the additional frequency information but does not receive the reporting precedence order information, the UE may first execute the measurement on the additional frequency so as to obtain the measurement result of the additional frequency. In the process of generating the measurement information element, the UE may include the measurement result of the serving cell of the UE in the measurement information element.

Then, the UE may include the cell selection or reselection measurement results in the remaining part of the measurement information element in a descending order according to the frequency priority order until the remaining part is fully filled, where the measurement result of the additional frequency has the highest reporting priority among the measurement results of the measurement type to which the additional frequency belongs.

In a fifth case, if the UE does not receive the additional frequency information and nor does it receive the reporting precedence order information, in the process of generating the measurement information element, the UE may first include the measure result of the serving cell of the UE in the measurement information element. Then, the UE may include the cell selection or reselection measurement results in the remaining part of the measurement information element in a descending order according to the frequency priority order until the remaining part is fully filled.

In S28, the UE may send the measurement information element generated in S26 to the radio network controller by using the uplink signaling message.

According the method shown in FIG. 2, in this embodiment, a UE is capable of reporting, according to a requirement of a radio network controller, information such as cell selection or reselection measurement results to the radio network controller; and can specify a reporting precedence order for various measurement types including an inter-system measurement, and can preferentially report the cell selection or reselection measurement results according to a specific reporting order, so as to accommodate a limitation on a size of an uplink signaling message.

Figure 3:
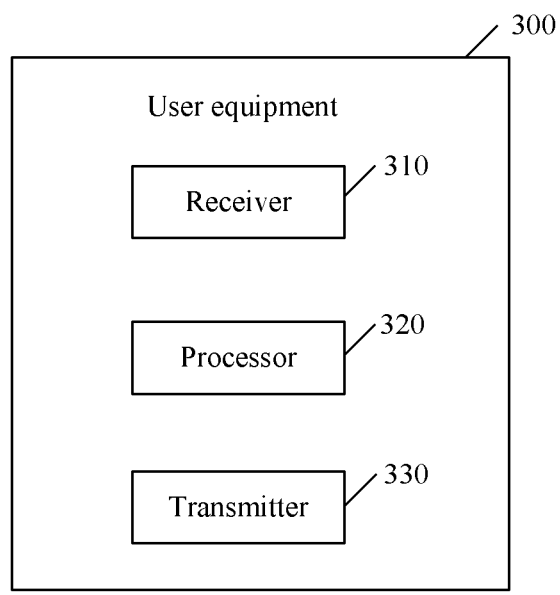
FIG. 3 shows a structural schematic diagram of a user equipment according to an embodiment of the present invention.

FIG. 3 shows a structural schematic diagram of a user equipment (UE) 300 according to an embodiment of the present invention. The user equipment 300 may execute the related operations of implementing a report measurement described with reference to FIG. 1 and/or the related operations of reporting a measurement result described with reference to FIG. 2.

As shown in FIG. 3, the UE 300 may include a receiver 310, a processor 320, and a transmitter 330.

When the UE 300 executes the method shown in FIG. 1, the receiver 310 may be configured to receive an MC message from a radio network controller when the UE is in a CELL_FACH state. The processor 320 may be configured to: if it is determined to execute a report measurement, execute the report measurement based on the MC message so as to obtain a measurement result; and generate an MR message based on the measurement result. The transmitter 330 may be configured to send the MR message to the radio network controller.

Optionally, the processor 320 may be configured to determine, based on coordination between the report measurement and a cell reselection measurement executed by the UE, whether to execute the report measurement.

Optionally, the processor 320 may be configured to: when a received signal level of a serving cell of the UE is higher than a first threshold and received signal quality of the serving cell is higher than a second threshold, determine to stop executing the cell reselection measurement and execute the report measurement.

Optionally, the processor 320 may be configured to: when the received signal level of the serving cell of the UE is lower than or equal to the first threshold or the received signal quality of the serving cell is lower than or equal to the second threshold, determine not to execute the report measurement.

Optionally, the processor 320 may be configured to: when the received signal level of the serving cell of the UE is lower than or equal to the first threshold or the received signal quality of the serving cell is lower than or equal to the second threshold, determine to execute the report measurement and meanwhile not to stop executing cell reselection measurement.

In addition, the receiver 310, the processor 320, and the transmitter 330 may further be specifically configured to execute various related operations involved in the embodiment and the instances described with reference to FIG. 1.

When the UE 300 executes the method shown in FIG. 2, the receiver 310 may be configured to receive a report indication from the radio network controller by using one message of an SIB message and an RRC message, where the report indication specifies a condition for reporting a measurement result. The processor 320 may be configured to acquire cell selection or reselection measurement results that need to be reported, and generate a measurement information element based on the report indication and by using the cell selection or reselection measurement results. The transmitter 330 may be configured to send the measurement information element to the radio network controller by using an uplink signaling message.

Optionally, the processor 320 may be configured to: if a size of the uplink signaling message is not limited, include all the cell selection or reselection measurement results in the measurement information element.

Optionally, the processor 320 may be configured to: if the size of the uplink signaling message is limited, include a part of the cell selection or reselection measurement results in the measurement information element.

Optionally, the receiver 310 may be configured to: attempt to receive additional frequency information from the radio network controller, where the additional frequency information indicates frequencies that are only used to execute a cell selection or reselection measurement but are not used to execute cell reselection assessment, and the additional frequency information is received in an SIB message or an RRC message same as or different from the one message in which the report indication is received; and attempt to receive reporting precedence order information from the radio network controller, where the reporting precedence order information specifies reporting a reporting precedence order of measurement results of different measurement types among the cell selection or reselection measurement results, the measurement types include one or more of an intra-frequency measurement, an inter-frequency measurement, and an inter-system measurement, and the reporting precedence order information is received in an SIB message or an RRC message same as or different from the one message in which the report indication is received.

Optionally, if the receiver 310 receives the additional frequency information and receives the reporting precedence order information, the processor 320 may be configured to: execute a measurement on additional frequencies so as to obtain measurement results of the additional frequencies; include a measurement result of the serving cell of the UE in the measurement information element; include the measurement results of the additional frequencies in the measurement information element; and include the cell selection or reselection measurement results in a remaining part of the measurement information element in a descending order according to a reporting precedence order until the remaining part is fully filled.

Optionally, if the receiver 310 receives the additional frequency information and receives the reporting precedence order information, the processor 320 may be configured to: execute the measurement on the additional frequencies so as to obtain the measurement results of the additional frequencies; include the measurement result of the serving cell of the UE in the measurement information element; and include the cell selection or reselection measurement results in the remaining part of the measurement information element in a descending order according to the reporting precedence order until the remaining part is fully filled, where the measurement results of the additional frequencies have the highest reporting priority among the measurement results of measurement types to which the additional frequencies belong.

Optionally, if the receiver 310 receives the additional frequency information but does not receive the reporting precedence order information, the processor 320 may be configured to: execute the measurement on the additional frequencies so as to obtain the measurement results of the additional frequencies; include a measurement result of the serving cell of the UE in the measurement information element; include the measurement results of the additional frequencies in the measurement information element; and include the cell selection or reselection measurement results in the remaining part of the measurement information element in a descending order according to a frequency priority order until the remaining part is fully filled.

Optionally, if the receiver 310 receives the additional frequency information but does not receive the reporting precedence order information, the processor 320 may be configured to: execute the measurement on the additional frequencies so as to obtain the measurement results of the additional frequencies; include the measurement result of the serving cell of the UE in the measurement information element; and include the cell selection or reselection measurement results in the remaining part of the measurement information element in a descending order according to the frequency priority order until the remaining part is fully filled, where the measurement results of the additional frequencies have the highest reporting priority among the measurement results of measurement types to which the additional frequencies belong.

Optionally, if the receiver 310 does not receive the additional frequency information and nor does it receive the reporting precedence order information, the processor 320 may be configured to: include the measurement result of the serving cell of the UE in the measurement information element; and include the cell selection or reselection measurement results in the remaining part of the measurement information element in a descending order according to the frequency priority order until the remaining part is fully filled.

In addition, the receiver 310, the processor 320, and the transmitter 330 may further be specifically configured to execute various related operations involved in the embodiment and the instances described with reference to FIG. 2.

Figure 4:
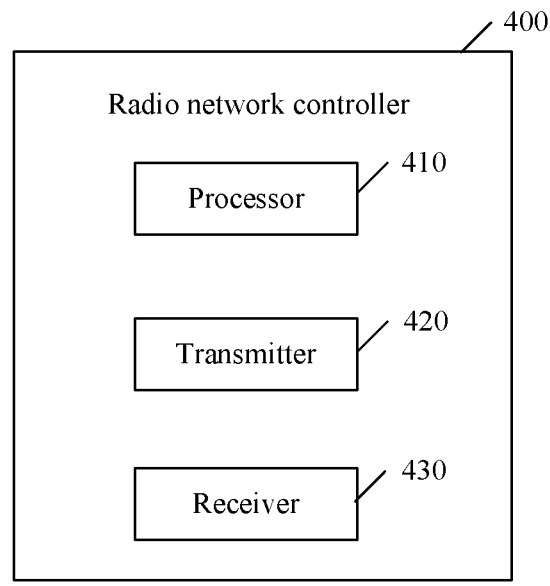
FIG. 4 shows a structural schematic diagram of a radio network controller according to an embodiment of the present invention.

FIG. 4 shows a structural schematic diagram of a radio network controller 400 according to an embodiment of the present invention. The radio network controller 400 may execute the related operations of implementing a report measurement described with reference to FIG. 1 and/or the related operations of reporting a measurement result described with reference to FIG. 2.

As shown in FIG. 4, the radio network controller 400 may include a processor 410, a transmitter 420, and a receiver 430.

When the radio network controller 400 executes the method shown in FIG. 1, the processor 410 may be configured to generate an MC message for a UE in a CELL_FACH state. The transmitter 420 may be configured to send the MC message to the UE. The receiver 430 may be configured to attempt to receive, from the UE, an MR message in response to the MC message, where the MR message is generated based on a measurement result of the UE. Optionally, a report measurement executed by the UE is based on coordination between the report measurement and a cell reselection measurement executed by the UE. In addition, the processor 410, the transmitter 420, and the receiver 430 may further be specifically configured to execute various related operations involved in the embodiment and instances described with reference to FIG. 1.

When the radio network controller 400 executes the method shown in FIG. 2, the processor 410 may be configured to generate a report indication, where the report indication specifies a condition for reporting a measurement result. The transmitter 420 may be configured to send the report indication to the UE by using one message of an SIB message and an RRC message. The receiver 430 may be configured to receive a measurement information element from the UE by using an uplink signaling message, where the measurement information element is generated based on the report indication and by using cell selection or reselection measurement results.

Optionally, if a size of the uplink signaling message is not limited, the measurement information element includes all the cell selection or reselection measurement results. Optionally, if a size of the uplink signaling message is limited, the measurement information element includes a part of the cell selection or reselection measurement results.

Optionally, the transmitter 420 may be configured to: send additional frequency information to the UE, where the additional frequency information indicates frequencies that are only used to execute a cell selection or reselection measurement but are not used to execute cell reselection assessment, and the additional frequency information is received in an SIB message or an RRC message same as or different from the one message in which the report indication is sent; and send reporting precedence order information to the UE, where the reporting precedence order information specifies a reporting precedence order of measurement results of different measurement types among the cell selection or reselection measurement results, where the measurement types include one or more of an intra-frequency measurement, an inter-frequency measurement, and an inter-system measurement, and the reporting precedence order information is sent in an SIB message or an RRC message same as or different from the one message in which the report indication is sent. In this case, the measurement information element may include a measurement result of a serving cell of the UE and measurement results of the additional frequencies, and a remaining part of the measurement information element may further include the cell selection or reselection measurement results arranged in a descending order according to the reporting precedence order.

Optionally, in a case that the transmitter 420 is configured to send the additional frequency information to the UE and send the reporting precedence order information to the UE, the measurement information element may include a measurement result of a serving cell of the UE, and a remaining part of the measurement information element may further include the cell selection or reselection measurement results arranged in a descending order according to the reporting precedence order, where the measurement results of the additional frequencies have the highest reporting priority among the measurement results of measurement types to which the additional frequencies belong.

Optionally, the transmitter 420 may be configured to send the additional frequency information to the UE. In this case, the measurement information element includes the measurement result of the serving cell of the UE and measurement results of the additional frequencies, and the remaining part of the measurement information element may further include the cell selection or reselection measurement results arranged in a descending order according to a frequency priority order.

Optionally, in a case that the transmitter 420 is configured to send the additional frequency information to the UE, the measurement information element may include the measurement result of the serving cell of the UE, and the remaining part of the measurement information element may further include the cell selection or reselection measurement results arranged in a descending order according to the reporting precedence order, where the measurement results of the additional frequencies have the highest reporting priority among the measurement results of measurement types to which the additional frequencies belong.

Optionally, the measurement information element may include the measurement result of the serving cell of the UE, and the remaining part of the measurement information element may further include the cell selection or reselection measurement results arranged in a descending order according to the frequency priority order.

In addition, the processor 410, the transmitter 420, and the receiver 430 may further be specifically configured to execute various related operations involved in the embodiment and instances described with reference to FIG. 2.

Figure 5:
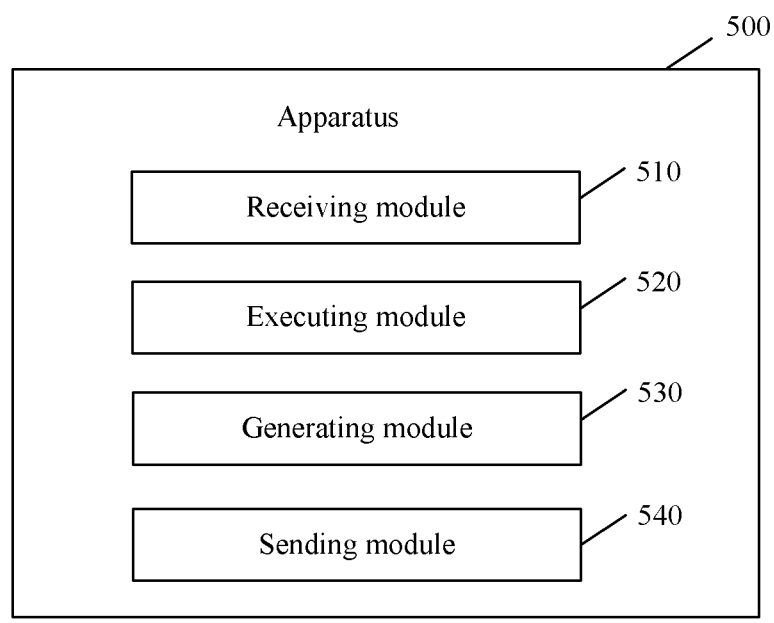
FIG. 5 shows a schematic diagram of an apparatus for implementing a report measurement according to an embodiment of the present invention.

FIG. 5 shows a schematic diagram of an apparatus 500 for implementing a report measurement according to an embodiment of the present invention. The apparatus 500 may not only be implemented as a user equipment but also be used as an internal unit of the user equipment. As shown in FIG. 5, the apparatus 500 may include a receiving module 510, an executing module 520, a generating module 530, and a sending module 540.

The receiving module 510 may be configured to receive an MC message from a radio network controller when a UE is in a CELL_FACH state. The executing module 520 may be configured to: if it is determined to execute a report measurement, execute the report measurement based on the MC message so as to obtain a measurement result. The generating module 530 may be configured to generate an MR message based on the measurement result. The sending module 540 is configured to send the MR message to the radio network controller.

In addition, the apparatus 500 may further include multiple functional modules configured to execute various operations of the user equipment described with reference to FIG. 1.

Figure 6:
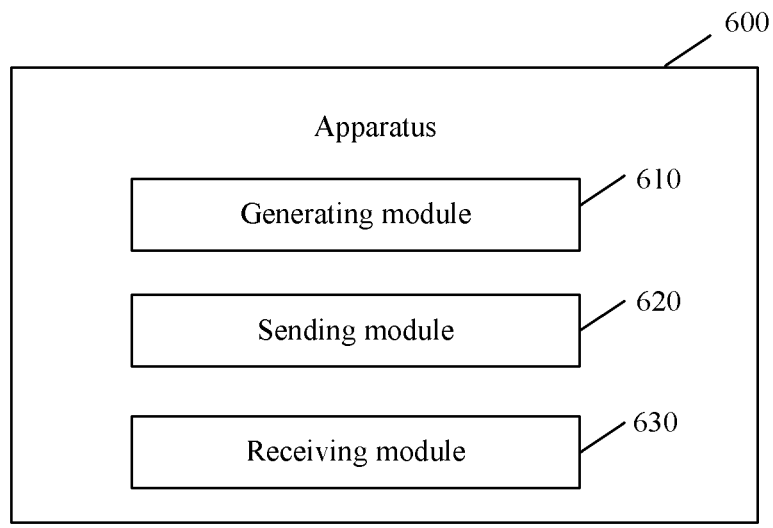
FIG. 6 shows a schematic diagram of an apparatus for implementing a report measurement according to another embodiment of the present invention.

FIG. 6 shows a schematic diagram of an apparatus 600 for implementing a report measurement according to another embodiment of the present invention. The apparatus 600 may not only be implemented as a radio network controller but also be used as an internal unit of the radio network controller. As shown in FIG. 6, the apparatus 600 may include a generating module 610, a sending module 620, and a receiving module 630.

The generating module 610 may be configured to generate an MC message for a UE in a CELL_FACH state. The sending module 620 may be configured to send the MC message to the UE. The receiving module 630 may be configured to attempt to receive, from the UE, an MR message in response to the MC message, where the MR message is generated based on a measurement result of a report measurement executed by the UE.

In addition, the apparatus 600 may further include multiple functional modules configured to execute various operations of the radio network controller described with reference to FIG. 1.

Figure 7:
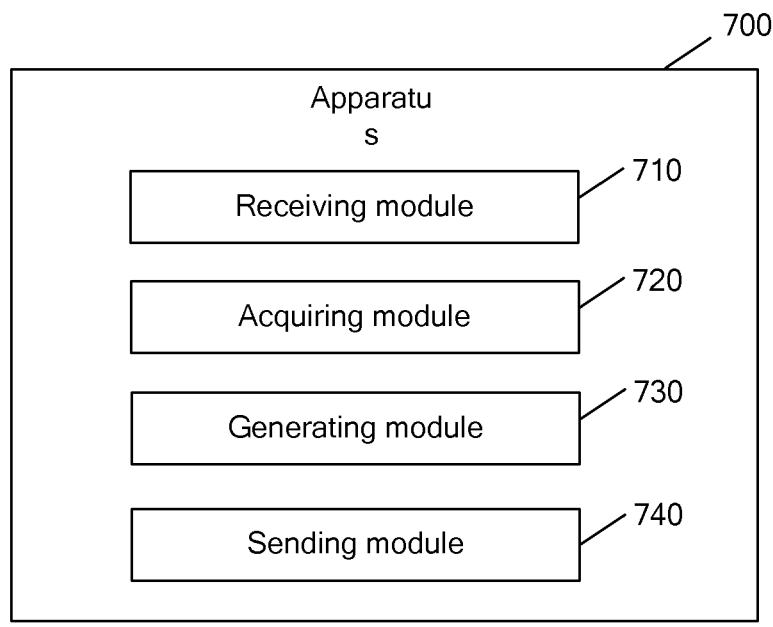
FIG. 7 shows a schematic diagram of an apparatus for reporting a measurement result according to another embodiment of the present invention.

FIG. 7 shows a schematic diagram of an apparatus 700 for reporting a measurement result according to another embodiment of the present invention. The apparatus 700 may not only be implemented as a user equipment but also be used as an internal unit of the user equipment. As shown in FIG. 7, the apparatus 700 may include a receiving module 710, an acquiring module 720, a generating module 730, and a sending module 740.

The receiving module 710 may be configured to receive a report indication from the radio network controller by using one message of an SIB message and an RRC message, where the report indication specifies a condition for reporting a measurement result. The acquiring module 720 may be configured to acquire cell selection or reselection measurement results that need to be reported. The generating module 730 may be configured to generate a measurement information element based on the report indication and by using the cell selection or reselection measurement results. The sending module 740 may be configured to send the measurement information element to the radio network controller by using an uplink signaling message.

In addition, the apparatus 700 may further include multiple functional modules configured to execute various operations of the user equipment described with reference to FIG. 2.

Figure 8:
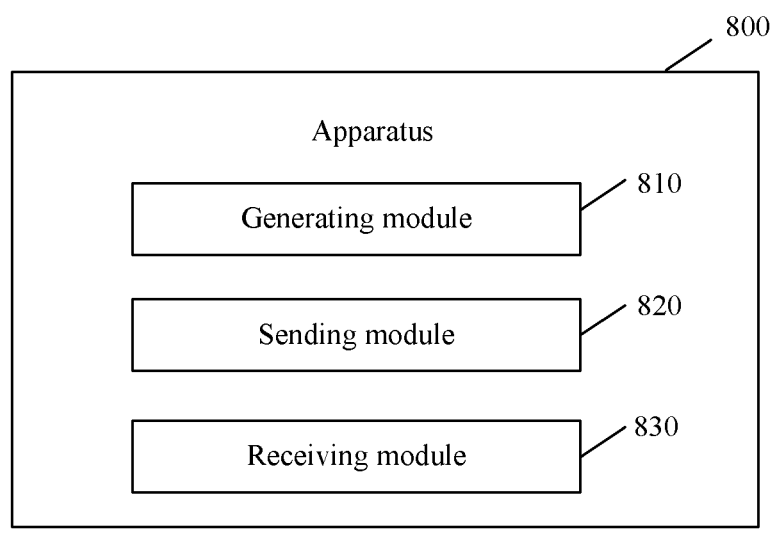
FIG. 8 shows a schematic diagram of an apparatus for reporting a measurement result according to another embodiment of the present invention.

FIG. 8 shows a schematic diagram of an apparatus 800 for reporting a measurement result according to another embodiment of the present invention. The apparatus 800 may not only be implemented as a radio network controller but also be used as an internal unit of the radio network controller. As shown in FIG. 8, the apparatus 800 may include a generating module 810, a sending module 820, and a receiving module 830.

The generating module 810 may be configured to generate a report indication, where the report indication specifies a condition for reporting a measurement result. The sending module 820 may be configured to send the report indication to the UE by using one message of an SIB message and an RRC message. The receiving module 830 may be configured to receive a measurement information element from the UE by using an uplink signaling message, where the measurement information element is generated based on the report indication and by using cell selection or reselection measurement results.

In addition, the apparatus 800 may further include multiple functional modules configured to execute various operations of the radio network controller described with reference to FIG. 2.

In addition, another embodiment of the present invention further provides a communication system, where the communication system may include a UE and a radio network controller that use a wireless technology for mutual communication.

In one aspect, the UE and the radio network controller may be configured to implement the method described with reference to FIG. 1. For example, the radio network controller may generate an MC message for a UE in a CELL_FACH state, and send the MC message to the UE. After the UE receives the MC message, if it is determined to execute a report measurement, the UE may execute the report measurement based on the MC message so as to obtain a measurement result, and further generate an MR message based on the measurement result. Then, the UE may send the MR message to the radio network controller. In addition, the UE and the radio network controller may be further configured to implement any other operations described with reference to FIG. 1.

In another aspect, the UE and the radio network controller may be configured to implement the method described with reference to FIG. 2. For example, the radio network controller may generate a report indication, and send the report indication to the UE by using an SIB message or an RRC message. After receiving the report indication, the UE may acquire cell selection or reselection measurement results that need to be reported. Then, the UE may generate a measurement information element based on the report indication and by using the cell selection or reselection measurement results. Optionally, when a size of the uplink signaling message used to transfer the measurement information element is limited, the UE may select, based on a specific sequence, measurement results to be included in the measurement information element. Then, the UE may send the measurement information element to the radio network controller by using the uplink signaling message. In addition, the UE and the radio network controller may be further configured to implement any other operations described with reference to FIG. 2.

Moreover, the UE may be further implemented as or include the apparatuses described with reference to FIG. 3, FIG. 7, and FIG. 7, and the radio network controller may be further implemented as or include the apparatuses described with reference to FIG. 4, FIG. 6, and FIG. 8.

Those skilled in the art can clearly understand that for description convenience and brevity, the division of the foregoing functional modules is described as an example only. In actual applications, the foregoing function allocation may be completed by different functional modules according to needs, that is, the internal structure of an apparatus is divided into different functional modules to complete all or a part of the foregoing described functions. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium and includes several instructions for instructing a computer device (which may be a personal computer, a server, or a network device) or a processor (Processor) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disc, or an optical disc.

The foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. An apparatus, comprising a processor coupled with a non-transitory storage medium storing executable instructions; wherein the executable instructions, when executed by the processor, cause the processor to:
   receive a report indication from a radio network controller by using one message of a system information block (SIB) message and a radio resource control (RRC) message, wherein the report indication specifies a condition for reporting a measurement result;
   acquire cell selection or reselection measurement results that need to be reported;
   generate, based on the report indication, a measurement information element by using the cell selection or reselection measurement results; and
   send the measurement information element to the radio network controller by using an uplink signaling message.

2. The apparatus according to claim 1, wherein the report indication comprises one or more of reporting quantities, a reporting threshold, the number of reported cells, and a number of reported frequencies.

3. The apparatus according to claim 2, wherein when a size of the uplink signaling message is limited, the generating the measurement information element comprises generating a part of the cell selection or reselection measurement results in the measurement information element.

4. The apparatus according to claim 3, wherein the executable instructions, when executed by the processor, further cause the processor to:
   attempt to receive additional frequency information from the radio network controller, wherein the additional frequency information indicates frequencies that are only used to execute a cell selection or reselection measurement but are not used to execute cell reselection assessment, and the additional frequency information is received in an SIB message or an RRC message that is the same as or different from the one message in which the report indication is received; and
   attempt to receive reporting precedence order information from the radio network controller, wherein the reporting precedence order information specifies a reporting precedence order of measurement results of different measurement types among the cell selection or reselection measurement results, the measurement types comprise one or more of an intra-frequency measurement, an inter-frequency measurement, and an inter-system measurement, and the reporting precedence order information is received in an SIB message or an RRC message that is the same as or different from the one message in which the report indication is received.

5. The apparatus according to claim 4, wherein the reporting precedence order information is a numerical value, different values in a value range of the numeral value correspond to a reporting precedence order of the three measurement types of the first measurement type, the second measurement type, and the third measurement type.

6. The apparatus according to claim 4, wherein the executable instructions, when executed by the processor, further cause the processor to:
   receive a reporting priority relationship between a first measurement type and a second measurement type from the radio network controller; and/or
   receive a reporting priority of a third measurement type from the radio network controller, wherein the reporting priority of the third measurement type indicates a reporting priority of measurement results of the third measurement type among the three measurement types of the first measurement type, the second measurement type, and the third measurement type.

7. The apparatus according to claim 6, wherein the first measurement type is reported preferentially or the second measurement type is reported preferentially, the first measurement type being reported preferentially indicates that measurement results of the first measurement type are reported earlier than measurement results of the second measurement type; and the second measurement type being reported preferentially indicates that the measurement results of the second measurement type are reported earlier than the measurement results of the first measurement type.

8. The apparatus according to claim 6, wherein the reporting priority of the third measurement type is a first priority among reporting priorities of the three measurement types of the first measurement type, the second measurement type, and the third measurement type; or, the reporting priority of the third measurement type is a second priority among the reporting priorities of the three measurement types of the first measurement type, the second measurement type, and the third measurement type; or, the reporting priority of the third measurement type is a third priority among the reporting priorities of the three measurement types of the first measurement type, the second measurement type, and the third measurement type, wherein the first priority is greater than the second priority, and the second priority is greater than the third priority.

9. The apparatus according to claim 6, wherein when the processor does not receive the reporting priority of the third measurement type from the radio network controller,
   the reporting priority of the measurement result of the third measurement type is a first priority or a third priority among the three measurement types of the first measurement type, the second measurement type, and the third measurement type.

10. The apparatus according to claim 6, wherein the first measurement type is an inter-frequency measurement or inter-system measurement type; the second measurement type is an inter-frequency measurement or inter-system measurement type; and the third measurement type is an intra-frequency measurement type.

11. The apparatus according to claim 1, wherein when a size of the uplink signaling message is not limited, the generating the measurement information element comprises generating all the cell selection or reselection measurement results in the measurement information element.

12. The apparatus according to claim 1, wherein the executable instructions, when executed by the processor, further cause the processor to:
receive additional frequency information from the radio network controller, wherein the additional frequency information indicates frequencies that are only used to execute a cell selection or reselection measurement but are not used to execute cell reselection assessment; or
receive reporting precedence order information from the radio network controller, wherein the reporting precedence order information specifies a reporting precedence order of measurement results of different measurement types among the cell selection or reselection measurement results, and the measurement types comprise one or more of an intra-frequency measurement, an inter-frequency measurement, and an inter-system measurement.

13. An apparatus, comprising a processor coupled with a non-transitory storage medium storing executable instructions; wherein the executable instructions, when executed by the processor, cause the processor to:
generate a report indication, wherein the report indication specifies a condition for reporting a measurement result;
send the report indication to a user equipment (UE) by using one message of a system information block (SIB) message and a radio resource control (RRC) message; and
receive a measurement information element from the UE by using an uplink signaling message, wherein the measurement information element is generated based on the report indication and by using cell selection or reselection measurement results.

14. The apparatus according to claim 13, wherein the report indication comprises one or more of reporting quantities, a reporting threshold, the number of reported cells, and the number of reported frequencies.

15. The apparatus according to claim 13, wherein when a size of the uplink signaling message is not limited, the measurement information element comprises all the cell selection or reselection measurement results.

16. A system for reporting a measurement result, comprising:
a user equipment (UE) configured to:
receive a report indication from a radio network controller by using one message of a system information block (SIB) message and a radio resource control (RRC) message, wherein the report indication specifies a condition for reporting a measurement result;
acquire cell selection or reselection measurement results that need to be reported, and generate a measurement information element based on the report indication and by using the cell selection or reselection measurement results; and
send the measurement information element to the radio network controller by using an uplink signaling message; and
a radio network controller configured to:
generate the report indication;
send the report indication to the UE by using one message of the SIB message and the RRC message; and
receive the measurement information element from the UE by using the uplink signaling message.

17. The system according to claim 16, wherein the UE is further configured to: when a size of the uplink signaling message is not limited, generate all the cell selection or reselection measurement results in the measurement information element.

18. The system according to claim 16, wherein the UE is further configured to: when a size of the uplink signaling message is limited, generate a part of the cell selection or reselection measurement results in the measurement information element.

19. The system according to claim 18, wherein the UE is further configured to: attempt to receive additional frequency information from the radio network controller, wherein the additional frequency information indicates frequencies that are only used to execute a cell selection or reselection measurement but are not used to execute cell reselection assessment, and the additional frequency information is received in an SIB message or an RRC message same as or different from the one message in which the report indication is received; and
attempt to receive reporting precedence order information from the radio network controller, wherein the reporting precedence order information specifies a reporting precedence order of measurement results of different measurement types among the cell selection or reselection measurement results, the measurement types comprise one or more of an intra-frequency measurement, an inter-frequency measurement, and an inter-system measurement, and the reporting precedence order information is received in an SIB message or an RRC message same as or different from the one message in which the report indication is received.

20. The system according to claim 19, wherein when the UE receives the additional frequency information and receives the reporting precedence order information, the UE is further configured to:
execute a measurement on an additional frequency so as to obtain measurement results of the additional frequencies;
generate a measurement result of a serving cell of the UE in the measurement information element;
generate the measurement results of the additional frequencies in the measurement information element; and
generate the cell selection or reselection measurement results in a remaining part of the measurement information element in a descending order according to the reporting precedence order until the remaining part is fully filled.

21. The system according to claim 19, wherein when the UE receives the additional frequency information and receives the reporting precedence order information, the UE is further configured to:
execute a measurement on an additional frequency so as to obtain measurement results of the additional frequencies;
generate a measurement result of a serving cell of the UE in the measurement information element; and generate the cell selection or reselection measurement results in a remaining part of the measurement information element in a descending order according to the reporting precedence order until the remaining part is fully filled, wherein the measurement results of the additional frequencies have the highest reporting priority among the measurement results of measurement types to which the additional frequencies belong.

22. The system according to claim 19, wherein when the UE receives the additional frequency information but does not receive the reporting precedence order information, the UE is further configured to:

execute a measurement on an additional frequency so as to obtain measurement results of the additional frequencies;

generate a measurement result of a serving cell of the UE in the measurement information element;

generate the measurement results of the additional frequencies in the measurement information element; and generate the cell selection or reselection measurement results in a remaining part of the measurement information element in a descending order according to a frequency priority order until the remaining part is fully filled.

23. The system according to claim 19, wherein when the UE receives the additional frequency information but does not receive the reporting precedence order information, the UE is further configured to:

execute a measurement on an additional frequency so as to obtain measurement results of the additional frequencies;

generate a measurement result of a serving cell of the UE in the measurement information element; and generate the cell selection or reselection measurement results in a remaining part of the measurement information element in a descending order according to a frequency priority order until the remaining part is fully filled, wherein the measurement results of the additional frequencies have the highest reporting priority among the measurement results of measurement types to which the additional frequencies belong.

24. The system according to claim 19, wherein when the UE does not receive the additional frequency information or the reporting precedence order information, the UE is further configured to:

generate a measurement result of a serving cell of the UE in the measurement information element; and generate the cell selection or reselection measurement results in a remaining part of the measurement information element in a descending order according to a frequency priority order until the remaining part is fully filled.

* * * * *